(12) United States Patent
Chang et al.

(10) Patent No.: US 9,200,175 B2
(45) Date of Patent: *Dec. 1, 2015

(54) ARTICLES COMPRISING A FLUOROCHEMICAL SURFACE LAYER AND RELATED METHODS

(75) Inventors: Cheng-Chung Chang, New Brighton, MN (US); Zai-Ming Qiu, Woodbury, MN (US); Naiyong Jing, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 84 days.

This patent is subject to a terminal disclaimer.

(21) Appl. No.: 11/321,679

(22) Filed: Dec. 29, 2005

(65) Prior Publication Data

US 2006/0148350 A1 Jul. 6, 2006

Related U.S. Application Data

(60) Provisional application No. 60/640,478, filed on Dec. 30, 2004.

(51) Int. Cl.
| | | |
|---|---|---|
| C09D 133/16 | (2006.01) | |
| B32B 27/06 | (2006.01) | |
| C09D 133/14 | (2006.01) | |
| C08L 39/00 | (2006.01) | |

(52) U.S. Cl.
CPC .............. *C09D 133/16* (2013.01); *B32B 27/06* (2013.01); *C09D 133/14* (2013.01); *C08L 39/00* (2013.01); *C08L 2205/02* (2013.01); *C08L 2312/00* (2013.01); *Y10T 442/20* (2015.04); *Y10T 442/2279* (2015.04); *Y10T 442/2287* (2015.04); *Y10T 442/2615* (2015.04); *Y10T 442/273* (2015.04); *Y10T 442/2738* (2015.04)

(58) Field of Classification Search
USPC .................... 428/500, 420, 421, 422
See application file for complete search history.

(56) References Cited

U.S. PATENT DOCUMENTS

| | | | |
|---|---|---|---|
| 3,250,808 A | 5/1966 | Moore et al. | |
| 3,544,537 A | 12/1970 | Wheaton | |
| 3,553,179 A | 1/1971 | Bartlett | |
| 3,810,874 A | 5/1974 | Mitsch et al. | |
| 4,262,072 A | 4/1981 | Wendling et al. | |
| 4,472,480 A | 9/1984 | Olson | |
| 4,567,073 A * | 1/1986 | Larson et al. | 428/40.7 |
| 4,614,667 A | 9/1986 | Larson et al. | |
| 4,654,233 A | 3/1987 | Grant et al. | |
| 4,681,925 A | 7/1987 | Strepparola et al. | |
| 4,732,941 A | 3/1988 | Numa | |
| 4,840,825 A * | 6/1989 | Aristodimou | 428/77 |
| 4,855,184 A | 8/1989 | Klum et al. | |
| 4,873,140 A | 10/1989 | McIntyre | |
| 4,885,332 A | 12/1989 | Bilkadi | |
| 4,894,405 A * | 1/1990 | Barron | 524/265 |
| 4,902,538 A * | 2/1990 | Piacenti et al. | 427/393.6 |
| 4,968,116 A | 11/1990 | Hulme-Lowe et al. | |
| 4,971,424 A | 11/1990 | Babirad et al. | |
| 4,985,473 A | 1/1991 | Williams et al. | |
| 5,011,979 A | 4/1991 | Gregorio et al. | |
| 5,021,501 A | 6/1991 | Ohmori et al. | |
| 5,064,695 A | 11/1991 | Hotta et al. | |
| 5,152,287 A | 10/1992 | Kane | |
| 5,239,026 A | 8/1993 | Babirad et al. | |
| 5,326,823 A | 7/1994 | Rolando et al. | |
| 5,446,205 A | 8/1995 | Marchionni et al. | |
| 5,623,037 A | 4/1997 | Simeone et al. | |
| 5,648,407 A | 7/1997 | Goetz et al. | |
| 5,677,050 A | 10/1997 | Bilkadi et al. | |
| 5,873,454 A * | 2/1999 | Nakamura | 200/514 |
| 5,948,478 A | 9/1999 | Lenti et al. | |
| 5,962,611 A | 10/1999 | Meijs et al. | |
| 6,132,861 A | 10/2000 | Kang et al. | |
| 6,224,949 B1 | 5/2001 | Wright et al. | |
| 6,238,798 B1 | 5/2001 | Kang et al. | |
| 6,245,833 B1 | 6/2001 | Kang et al. | |
| 6,299,799 B1 | 10/2001 | Craig et al. | |
| 6,376,572 B1 | 4/2002 | Turri | |
| 6,383,633 B1 | 5/2002 | Allewaert et al. | |
| 6,391,459 B1 | 5/2002 | Szum et al. | |
| 6,395,822 B1 | 5/2002 | Edgington | |
| 6,646,088 B2 | 11/2003 | Fan et al. | |

(Continued)

FOREIGN PATENT DOCUMENTS

| | | |
|---|---|---|
| EP | 0247489 A | 12/1987 |
| EP | 0336372 A | 10/1989 |

(Continued)

OTHER PUBLICATIONS

Bongiovanni, R.; Montefusco, F.; Priola, A.; Macchioni, N.; Lazzeri, S.; Sozzi, L.; Ameduri, B., Photocurable Wood Coatings Containing Fluorinated Monomers. Pitture e Vernici, European Coatings (2003), 79 (11), pp. 25-30.

Bongiovanni, Roberta; Malucelli, Giulio; Priola, Aldo. UV-Curing of Fluorinated Systems: Synthesis and Properties. ACS Symposium Series (2003), 847 (Photoinitiated Polymerization), pp. 499-510.

Bongiovanni, R.; Lombardi, V.; Priola, A.; Tonelli, C.; Di Meo, A. Surface Properties of Acrylic Coatings Containing Perfluoropolyether Chains. Surface Coatings International, Part B: Coatings Transactions (2003), 86 (B1), pp. 53-57.

Bongiovanni, R.; Montefusco, F.; Priola, A.; Macchioni, N.; Lazzeri, S.; Sozzi, L.; Ameduri, B. High Performance UV-cured Coatings for Wood Protection. Progress in Organic Coatings (2002), 45(4), pp. 359-363.

(Continued)

*Primary Examiner* — Lynda Salvatore
(74) *Attorney, Agent, or Firm* — Julie Lapos-Kuchar; Pamela L. Stewart; Sean J. Edman

(57) ABSTRACT

The invention features an article comprising a reactive substrate that forms a covalent or hydrogen bond with a surface layer. The surface layer of the article comprises the reaction product of at least one monoterminated (per)fluoropolyether (meth)acryl compound and at least one monomer or oligomer having at least two (meth)acryl groups.

22 Claims, No Drawings

(56) References Cited

U.S. PATENT DOCUMENTS

| | | | |
|---|---|---|---|
| 6,660,338 B1 | 12/2003 | Hargreaves | |
| 6,660,388 B2 | 12/2003 | Liu et al. | |
| 6,660,389 B2 | 12/2003 | Liu et al. | |
| 6,680,118 B2 | 1/2004 | Szum et al. | |
| 6,730,388 B2 | 5/2004 | MacQueen et al. | |
| 6,777,458 B1 * | 8/2004 | Jaworek et al. | 522/1 |
| 6,861,102 B2 | 3/2005 | Wu et al. | |
| 6,923,921 B2 | 8/2005 | Flynn et al. | |
| 6,995,222 B2 | 2/2006 | Buckanin et al. | |
| 7,094,829 B2 | 8/2006 | Audenaert et al. | |
| 7,101,618 B2 * | 9/2006 | Coggio et al. | 428/336 |
| 7,141,537 B2 | 11/2006 | Audenaert et al. | |
| 7,173,778 B2 | 2/2007 | Jing et al. | |
| 2001/0034458 A1 | 10/2001 | Anderson et al. | |
| 2002/0115820 A1 | 8/2002 | Wang et al. | |
| 2003/0060534 A1 | 3/2003 | Fukushima et al. | |
| 2004/0077238 A1 | 4/2004 | Audenaert et al. | |
| 2005/0026414 A1 | 2/2005 | Williams | |
| 2005/0072336 A1 | 4/2005 | Itoh et al. | |
| 2005/0137355 A1 | 6/2005 | Buskanin et al. | |
| 2005/0249940 A1 * | 11/2005 | Klun et al. | 428/323 |
| 2005/0249942 A1 | 11/2005 | Coggio et al. | |
| 2005/0249956 A1 | 11/2005 | Jing et al. | |
| 2005/0250921 A1 | 11/2005 | Qiu et al. | |
| 2005/0260414 A1 * | 11/2005 | MacQueen | 428/421 |
| 2006/0251885 A1 | 11/2006 | Coggio et al. | |
| 2007/0014018 A1 | 1/2007 | Wheatley et al. | |
| 2008/0008888 A1 * | 1/2008 | Chang et al. | 428/421 |
| 2008/0281066 A1 * | 11/2008 | Paiva et al. | 526/246 |

FOREIGN PATENT DOCUMENTS

| | | |
|---|---|---|
| EP | 0443070 B1 | 8/1991 |
| EP | 0622353 A | 2/1994 |
| EP | 1571165 A | 9/2005 |
| JP | 61-101507 | 5/1986 |
| JP | 62-006427 | 1/1987 |
| JP | 1993/209030 A | 8/1993 |
| JP | 6-136062 | 5/1994 |
| JP | 1999/080312 | 3/1999 |
| JP | 2003-047908 | 2/2003 |
| JP | 2004/204096 | 7/2004 |
| WO | WO 03/072625 A1 | 9/2003 |
| WO | WO 03/100159 | 12/2003 |
| WO | WO 2004/002734 A1 | 1/2004 |
| WO | WO 2005/049687 A1 | 6/2005 |
| WO | WO 2005/113641 A1 | 12/2005 |
| WO | WO 2005/113642 A1 | 12/2005 |
| WO | WO 2005/113690 A2 | 12/2005 |
| WO | WO 2006/007507 A1 | 1/2006 |

OTHER PUBLICATIONS

Bongiovanni, Roberta; Malucelli, Giulio; Priola, Aldo. UV-Curing of Fluorinated Systems: Synthesis and Properties. Polymer Preprints (American Chemical Society, Division of Polymer Chemistry) (2001), 42(2), pp. 801-802.

Bongiovanni, R.; Beamson, G.; Mamo, A.; Priola, A.; Recca, A.; Tonelli, C. High Resolution XPS Investigation of Photocured Films Containing Perfluoropolyether Acrylates. Polymer (1999), Volume Date 2000, 41(2), pp. 409-414.

Bongiovanni, R.; Malucelli, G.; Priola, A. High Performance UV-Cured Coatings Containing Fluorinated Monomers. Pigment & Resin Techology (1999), 28(1), 26-30.

Ameduri, B.; Bongiovanni, R.; Malucelli, G.; Pollicino, A.; Priola, A. New Fluorinated Acrylic Monomers for the Surface Modification of UV-Curable Systems. Journal of Polymer Science, Part A: Polymer Chemistry (1999), 37(1), pp. 77-87.

Bongiovanni, .Roberts; Malucelli, Giulio; Pollicino, Antonino; Tonelli; Claudio; Simeone, Giovanni; Priola, Aldo. PerFluoropolyether Structures as Surfaces Modifying Agents of UV-Curable Systems. Macromolecular Chemistry and Physics (1998), 199(6), pp. 1099-1105.

Priola, Aldo; Bongiovanni, Roberta; Malucelli, Giulio; Pollicino, Antonino; Tonelli, Claudio; Simeone, Giovanni. UV-Curable Systems Containing Perfluoropolyether Structures. Synthesis and Characterization. Macromolecular Chemistry and Physics (1997), 198(6), pp. 1893-1907.

Viengkhou, Visay; NG, oo-Tech, Garnett, John L., Role of Additives on UV Curable Coatings on Wood, Journal of Applied Polymer Science, vol. 61, (1996) pp. 2361-2366.

Ameduri, B.; Bongiovanni, R.; Lombardi, V.; Pollicino, A.; Priola, A.; Recca, A., Effect of the Structural Parameters of a Series of Fluoromonoacrylates on the Surface Properties of Cured Films, Journal of Polymer Science: Part A: Polymer Chemistry, vol. 39, (20021), pp. 4227-4235.

U.S. Appl. No. 11/571,055, filed Jun. 30, 2005, Hardcoat Compositions and Methods.

U.S. Appl. No. 11/279,653, filed Apr. 13, 2006, Method of Making Urethane Based Fluorinated Monomers.

U.S. Appl. No. 11/279,657, filed Apr. 13, 2006, Flooring Substrate Having a Coating of a Curable Composition.

U.S. Appl. No. 11/321,680, filed Dec. 29, 2005, Stain-Resistant Fluorochemical Compositions.

* cited by examiner

ARTICLES COMPRISING A FLUOROCHEMICAL SURFACE LAYER AND RELATED METHODS

CROSS REFERENCE TO RELATED APPLICATIONS

This application claims the benefit of U.S. Provisional Application No. 60/640,478, filed on Dec. 30, 2004.

FIELD OF THE INVENTION

The present invention relates to articles having a protective fluorochemical surface layer and methods of making such articles.

BACKGROUND

Certain commonly used materials, such as optical displays, textiles, metals, stone, wood, leather, etc, are susceptible to scratches, abrasion, and soiling during routine use. In some instances, protective films or coatings may be applied to the surfaces of these materials in order to provide protection and enhance durability, performance and appearance.

UV-curable systems based on the polymerization of an acrylic resin have been used as protective coating compositions for a variety of surfaces. In some instances, it may be desirable to modify or enhance the performance of these coatings by introducing particular structures, such as fluorinated groups, into the polymeric network. Fluorinated groups can be incorporated into these compositions through the copolymerization of the acrylic resin with a low amount (<1%, w/w) of a fluorinated monomer, such as a fluorinated acrylate compound.

Although various protective coatings have been developed using fluorinated polymers, a need remains for improved coating compositions with better performance and longevity than existing systems.

SUMMARY

In hardcoat systems that involve the copolymerization of an acrylic resin with a fluorinated monomer, we have found that with certain substrates it is possible to achieve enhanced adhesion of the hardcoat layer to the substrate, which results in improved durability of the refinished article, through the use of particular (per)fluoropolyether (meth)acryl compounds. In general, the present invention features an article comprising a reactive substrate that forms a covalent or hydrogen bond with a surface layer. The surface layer of the article comprises the reaction product of at least one monoterminated (per)fluoropolyether (meth)acryl compound and at least one monomer or oligomer having at least two (meth)acryl groups.

In an alternative embodiment, the substrate is a porous substrate, and the coating composition penetrates the pores of the substrate, thereby holding to the substrate via a physical interaction with the substrate.

In one embodiment of the invention, the monoterminated (per)fluoropolyether (meth)acryl compound comprises at least one terminal $F(CF(CF_3)CF_2O)xCF(CF_3)$— group and at least one, preferably two, meth(acryl) groups, wherein x averages from 3 to 15. In a preferred embodiment, the monoterminated (per)fluoropolyether (meth)acryl compound comprises
$F—(CF(CF_3)CF_2O)n-CF(CF_3)CONHCH_2CH_2O_2C—C(R)=CH_2$, wherein R is a methyl group or hydrogen and n is 3 to 12. In an alternative embodiment, the monoterminated (per)fluoropolyether (meth)acryl compound comprises $C_4F_9SO_2N(Me)C_2H_4O_2C—C(R)=CH_2$, wherein R is a methyl (Me) or hydrogen (H).

In yet another embodiment, the fluorochemical component comprises a compound represented by the formula $C_pF_{2p+1}C_2H_4O_2CCH=CH_2$, where p is 3 to 20, preferably 6-8, or comprises a compound represented by the formula $C_pF_{2p+1}SO_2(R)C_2H_4O_2CCH=CH_2$ where R is a $C_1$ to $C_6$ alkyl group.

In certain implementations of the invention, the monomer or oligomer that reacts with the fluorochemical component of the composition is selected from the group consisting of di(meth)acryl containing compounds, tri(meth)acryl containing compounds, higher functionality (meth)acryl containing, and oligomeric (meth)acryl compounds. In some embodiments, tripropyleneglycol diacrylate is preferred. Additional examples of suitable compounds include glycerol triacrylate, pentaerythritol triacrylate, ethoxylated pentaerythritol triacrylates, trimethylolpropane triacrylate, ethoxylated trimethylolpropane triacrylates, ditrimethylolpropane tetraacrylate, dipentaerythritol pentaacrylate, pentaerythritol tetraacrylate, and the like.

In some embodiments, the substrate has reactive groups, such as chloride, bromide, iodide, alkene (C=C), alkyne, —OH, —CO$_2$, CONH groups and the like, that interact with the surface layer to aid in adhesion through the formation of a covalent or hydrogen bond with the surface layer. The bond is generally formed during polymerization of the surface layer composition. In one embodiment, the substrate is selected from the group consisting of fibrous substrates, such as woven, non-woven and knit fabrics, textiles, carpets, leather, and paper, and hard substrates, such as vinyl, wood, ceramic, masonry, concrete, natural stone, man-made stone, grout, metal sheets and foils, wood, paint, plastics, and films of thermoplastic resins, such as polyesters, polyamides (nylon), polyolefins, polycarbonates and polyvinylchloride.

Other features and advantages of the present invention will be apparent from the following detailed description thereof, and from the claims.

DEFINITIONS

As used herein "(per)fluoropolyether (meth)acryl compound" refers to a compound comprising at least one (per)fluoropolyether group and at least one (meth)acryl group, which are typically joined by a linking group. Typically, the (meth)acryl group is a (meth)acrylate group optionally substituted with hydrogen or fluorine. The term "(meth)acryl" includes both acryl and methacryl groups/compounds. In at least some embodiments, acrylate groups are preferred. As used herein, (meth)acryl groups includes those class of compounds such as (meth)acrylate esters, (meth)acrylamides, and N-alkyl (meth)acrylamides, optionally substituted with hydrogen or fluorine. Preferably, the (meth)acryl group is a (meth)acrylate group optionally substituted with hydrogen or fluorine. In at least some embodiments, acrylate groups are preferred.

By "monoterminated (per)fluoropolyether (meth)acryl compound" is meant a compound that can be represented by the following Formula I:

$$R'O—X—Q—R''$$ (Formula I)

wherein R' is F, CF$_3$, C$_2$, F$_5$, or C$_3$F$_7$; X is a (per)fluoropolyether group; Q is —C(O)NH(CH$_2$)$_a$ or —(CH$_2$)$_b$O(CH$_2$)$_a$ wherein a is 1-5 and b is 1-5, preferably 1; and R" is —OC(O)CH=CH$_2$, —C(O)NH(C$_2$H$_4$O)$_b$(CH$_2$)$_a$, —OC(O)

CMe=CH$_2$, —OC(O)NHCH$_2$CH$_2$OC(O)CMe=CH$_2$, —CH(OC(O)CH=CH$_2$)$_2$, —CH(OC(O)CMe=CH$_2$)$_2$, —N(CH$_2$CH$_2$OC(O)CH=CH$_2$)$_2$, —N(CH$_2$CH$_2$OC(O)CMe=CH$_2$)$_2$, —N(—C(O)CH=CH$_2$)(—CH$_2$CH$_2$OC(O)CH=CH$_2$), —NMeCH$_2$CH$_2$CO$_2$CH$_2$CEt(CH$_2$OC(O)CH=CH$_2$)$_2$ or —O-triurethane(NHCO$_2$CH$_2$CH$_2$OC(O)CH=CH$_2$)$_2$ or a compound that can be represented by the following Formula II

 (Formula II)

wherein R$_f$ is a monofunctional terminal group selected from the group consisting of (per)fluoropolyether groups; X and W are optional linking groups, which may or may not be present and each W may be the same or different; and R$_A$ is a (meth)acryl group or —C(O)CF=CH$_2$; and y is 1 or 2.

By "hardcoat" or "topcoat" is meant a crosslinkable or crosslinked composition that optionally comprises inorganic articles.

By "low surface energy" is meant that the surface layer of the articles described herein preferably exhibits a static contact angle with water of at least 70°. More preferably the contact angle with water is at least 80° and even more preferably at least 90° (e.g. at least 95°, at least 100°). Alternatively or in addition thereto, the advancing contact angle with hexadecane is at least 50° and more preferably at least 60°. Low surface energy is indicative of anti-soiling properties as well as the surface being easy to clean. As yet another indication of low surface energy, ink from a marker commercially available under the trade designation "SANFORD (R) KING SIZE permanent marker" preferably beads up. Further, the surface layer and articles described herein exhibit "ink repellency", meaning that the ink can easily be removed by wiping with a tissue commercially available from Kimberly Clark Corporation, Roswell, Ga. under the trade designation "SURPASS FACIAL TISSUE".

As used herein "wt-%" refers to weight percent solids based on the coating composition or reaction product thereof unless specified otherwise.

The recitation herein of numerical ranges by endpoints includes all numbers subsumed within that range (e.g., 1 to 5 includes 1, 1.5, 2, 2.75, 3, 3.80, 4 and 5).

As used in this specification and the appended claims, the singular forms "a", "an", and "the" also include the plural forms unless the context clearly dictates otherwise. Thus, for example, reference to a composition containing "a compound" includes a mixture of two or more compounds. In addition, the term "or" is generally used in the sense of "and/or" unless the context clearly dictates otherwise.

Unless otherwise indicated, all numbers expressing quantities of ingredients, measurement of properties such as surface energy, contact angles, and so forth used in the instant specification and claims are to be understood as being modified in all instances by the term "about." Accordingly, unless indicated to the contrary, the numerical parameters set forth in the specification and attached claims are approximations that can vary depending upon the desired properties sought by those skilled in the art utilizing the teachings of the present invention. At the very least, and not as an attempt to limit the application of the doctrine of equivalents to the scope of the claims, each numerical parameter should at least be construed in light of the number of reported significant digits by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors and uncertainties necessarily resulting from the standard deviations found in their respective testing measurements.

DETAILED DESCRIPTION

The invention features an article comprising a reactive substrate having a protective surface layer that comprises the reaction product of at least one monoterminated (per)fluoropolyether (meth)acryl compound and at least one monomer or oligomer having at least two (meth)acryl groups. The surface layer of the article is covalently or hydrogen bonded to the reactive substrate and provides the article with low surface energy, which imparts the article with easy cleaning properties and protection against common stains, such as ink, shoe polish, food stains, and the like.

(Meth)acryl Monomers and Oligomers

A wide variety of (meth)acryl monomers and/or oligomers can be used in the coating compositions, such as, for example, di(meth)acryl containing compounds such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated (10) bisphenol A diacrylate, ethoxylated (3) bisphenol A diacrylate, ethoxylated (30) bisphenol A diacrylate, ethoxylated (4) bisphenol A diacrylate, hydroxypivalaldehyde modified trimethylolpropane diacrylate, neopentyl glycol diacrylate, polyethylene glycol (200) diacrylate, polyethylene glycol (400) diacrylate, polyethylene glycol (600) diacrylate, propoxylated neopentyl glycol diacrylate, tetraethylene glycol diacrylate, tricyclodecanedimethanol diacrylate, triethylene glycol diacrylate, tripropylene glycol diacrylate; tri(meth)acryl containing compounds such as glycerol triacrylate, trimethylolpropane triacrylate, ethoxylated triacrylates (e.g., ethoxylated (3) trimethylolpropane triacrylate, ethoxylated (6) trimethylolpropane triacrylate, ethoxylated (9) trimethylolpropane triacrylate, ethoxylated (20) trimethylolpropane triacrylate), pentaerythritol triacrylate, propoxylated triacrylates (e.g., propoxylated (3) glyceryl triacrylate, propoxylated (5.5) glyceryl triacrylate, propoxylated (3) trimethylolpropane triacrylate, propoxylated (6) trimethylolpropane triacrylate), trimethylolpropane triacrylate, tris(2-hydroxyethyl)isocyanurate triacrylate; higher functionality (meth)acryl containing compounds such as ditrimethylolpropane tetraacrylate, dipentaerythritol pentaacrylate, ethoxylated (4) pentaerythritol tetraacrylate, pentaerythritol tetraacrylate, caprolactone modified dipentaerythritol hexaacrylate; oligomeric (meth)acryl compounds such as, for example, urethane acrylates, polyester acrylates, epoxy acrylates; polyacrylamide analogues of the foregoing; and combinations thereof. Such compounds are widely available from vendors such as, for example, Sartomer Company, Exton, Pa.; UCB Chemicals Corporation, Smyrna, Ga.; and Aldrich Chemical Company, Milwaukee, Wis. Additional useful (meth)acrylate materials include hydantoin moiety-containing poly(meth)acrylates, for example, as described in U.S. Pat. No. 4,262,072 (Wendling et al.).

Preferred commercially available (meth)acryl compounds include those available from Sartomer Company, Exton, Pa. such as tripropyleneglycol diacrylate available under the trade designation "SR306", trimethylolpropane triacrylate available under the trade designation "SR351", pentaerythritol triacrylate available under the trade designation "SR444", dipentaerythritol pentaacrylate available under the trade designation "SR399LV", ethoxylated (3) trimethylolpropane triacrylate available under the trade designation "SR454", and ethoxylated (4) pentaerythritol triacrylate, available under the trade designation "SR494".

Although as little as 5 wt-% of the non-fluorinated (meth) acrylate monomer or oligomer may result in suitable durability for some applications, it is typically preferred to maximize the concentration of non-fluorinated (meth)acrylate monomer or oligomer, particularly since these compounds are generally less expensive than fluorinated compounds. Accordingly, the coating compositions described herein typically comprise at least 20 wt-% non-fluorinated (meth)acrylate monomer or oligomer. In some implementations the total amount of non-fluorinated (meth)acrylate monomer or oligomer may comprise at least 50 wt-% and may be for example at least 60 wt-%, at least 70 wt-%, at least 80 wt-%, at least 90 wt-% and even about 95 wt-% of the coating composition.

Additional suitable monomers and oligomers are described in a U.S. patent application entitled "Stain Resistant Fluorochemical Compositions", having Ser. No. 60/640, 471, filed on even date herewith, which is incorporated by reference herein in its entirety.

Fluorochemical

The coating composition described herein also comprises at least one monoterminated (per)fluoropolyether (meth) acryl compound, either alone or in combination with other fluorinated monomers. The total amount of monoterminated (per)fluoropolyether (meth)acryl compound in the coating composition that is polymerized to form the surface layer is typically at least 0.5 wt-% (e.g. at least about 1 wt-%, 2 wt-%, 3 wt-%, and 4 wt-%). Preferably, the coating composition comprises at least about 5 wt-% monoterminated (per)fluoropolyether (meth)acryl compounds. In some embodiments, the coating composition may contain as much as 95 wt-% (per)fluoropolyether (meth)acryl compounds. However, it is generally more cost effective to employ a minimal concentration of the monoterminated (per)fluoropolyether (meth) acryl compound that provide the desired low surface energy. Accordingly, the total amount of monoterminated (per)fluoropolyether (meth)acryl compound(s) provided in the coating composition typically does not exceed 30 wt-% and preferably is present in an amount of no more than about 15 wt-% (e.g. less than about 14 wt-%, 13 wt-%, 12 wt-%, and 11 wt-%).

In one embodiment, the monoterminated (per)fluoropolyether (meth)acrylate compound is any compound represented by the following Formula I:

$$R'O-X-Q-R'' \quad \text{(Formula I)}$$

wherein R' is F, $CF_3$, $C_2F_5$, or $C_3F_7$; X is a (per)fluorpolyether group; Q is $-C(O)NH(CH_2)_a$ or $-CH_2)_bO(CH_2)_a$ wherein a is 1-5 and b is 1; and R" is $-OC(O)CH=CH_2$, $-OC(O)CMe=CH_2$, $-OC(O)NHCH_2CH_2OC(O)CMe=CH_2$, $-CH(OC(O)CH=CH_2)_2$, $-CH(OC(O)CMe=CH_2)_2$, $-N(CH_2CH_2OC(O)CH=CH_2)_2$, $-N(CH_2CH_2OC(O)CMe=CH_2)_2$, $-N(-C(O)CH=CH_2)(-CH_2CH_2OC(O)CH=CH_2)$, $-NMeCH_2CH_2CO_2CH_2CEt(CH_2OC(O)CH=CH_2)_2$ or $-O$-triurethane$(NHCO_2CH_2CH_2OC(O)CH=CH_2)_2$.

Other suitable monoterminated (per)fluoropolyether (meth)acryl compounds that may be used in the coating composition include those represented by the following Formula II:

$$(R_f)-[(W)-(R_A)]_w \quad \text{(Formula II)}$$

wherein $R_f$ is a monofunctional group selected from the group consisting of (per)fluoropolyether group; W is a linking group; and $R_A$ is a (meth)acryl group or $-COCF=CH_2$; and w is 1 or 2.

The linking group W between the perfluoropolyether segment and (meth)acryl or $-COCF=CH_2$ endgroup includes a divalent group selected from an alkylene, arylene, heteroalkylene, or combinations thereof and an optional divalent group selected from carbonyl, carbonyloxy, carbonylimino, sulfonamido, or combinations thereof. W can be unsubstituted or substituted with an alkyl, aryl, halo, or combinations thereof. The W group typically has no more than 30 carbon atoms. In some compounds, the W group has no more than 20 carbon atoms, no more than 10 carbon atoms, no more than 6 carbon atoms, or no more than 4 carbon atoms. For example, W can be an alkylene, an alkylene substituted with an aryl group, or an alkylene in combination with an arylene.

The perfluoropolyether acrylate compounds (e.g. of Formula II) can be synthesized by known techniques such as described in U.S. Pat. Nos. 3,553,179 and 3,544,537.

The coating composition described herein may comprise a monofunctional fluorinated compound that can be represented by the following Formula III:

$$(R_A)-W'-(CH_2R^{F1}-H) \quad \text{(Formula III)}$$

wherein $R_A$ is as previously described (i.e. a (meth)acrylate or a $CH_2=CFCO$ group); $R^{F1}$ is a fluoroalkylene group comprising 2 to 7 carbon atoms; and W' is a linking group.

$R_A$ of Formula III is preferably an acrylate group. $R^{F1}$ may be a linear or branched perfluorinated alkylene moiety.

The monofunctional fluorinated compounds of Formula III can be synthesized by known techniques. An exemplary monofunctional fluorinated compound of Formula III, ω-hydro 2,2,3,3,4,4,5,5-octafluoropentyl acrylate ($H-C_4F_8-CH_2O-C(O)-CH=CH_2$), is commercially available from Oakwood Products, West Columbia, S.C. Monofunctional fluorinated compounds of Formula III having the formula $H(CF_2)nCH_2OCOCH=CH_2$ where n=2, 4, and 6 as well as $CF_3CHFCF_2CH_2OCOC(CH_3)CH_2$ (2,2,3,4,4,4 hexafluorobutyl methacrylate) are commercially available from Lancaster Chemical, Windham, N.H.

The inclusion of one or more monofunctional fluorinated compounds of Formula III can further improve the compatibility of at least certain perfluoropolyether acrylate compounds with the poly(meth)acrylate crosslinking agents. This aspect is particularly advantageous for embodiments wherein a monofunctional perfluoropolyether acrylate compound is employed such HFPO$-C(O)N(H)CH_2CH_2OC(O)CH=CH_2$.

The amount of monofunctional fluorinated compound(s) of Formula III utilized in the coating composition of the invention can vary depending on the kind and amount of (per)fluoropolyether acrylate compound employed. Typically, the amount ranges from about half the amount of the (per)fluoropolyether acrylate compound to about twice the amount of the (per)fluoropolyether acrylate compound.

The coating composition described herein may further various other reactive and non-reactive ingredients. For example the composition may comprise polymerizable (meth)acryl compounds with alkyl, perfluoroalkyl, and perfluoroalkylene moieties. Examples of these compounds include butyl acrylate, 1H,1H-2,2,3,3,4,4,4-heptafluorobutyl acrylate, available from Sigma-Aldrich; 1H,1H,2H,2H-perfluorodecyl acrylate, available from Lancaster Synthesis, Windham, N.H.; and $C_4F_9SO_2N(CH_3)CH_2CH_2OC(O)CH=CH_2$ made by the procedure of Examples 2A and 2B of WO01/30873A. Numerous other (meth)acryl compounds with perfluoroalkyl moieties are mentioned in U.S. Pat. No. 4,968,116 and in U.S. Pat. No. 5,239,026 (including (perfluorocyclohexyl)methyl acrylate).

Initiators for Polymerization of the Coating Composition

To facilitate curing, polymerizable compositions according to the present invention may further comprise at least one free-radical thermal initiator and/or photoinitiator. Typically, if such an initiator and/or photoinitiator are present, it comprises less than about 10 percent by weight, more typically less than about 5 percent of the polymerizable composition, based on the total weight of the polymerizable composition. Free-radical curing techniques are well known in the art and include, for example, thermal curing methods as well as radiation curing methods such as electron beam or ultraviolet radiation. Further details concerning free radical thermal and photopolymerization techniques may be found in, for example, U.S. Pat. No. 4,654,233 (Grant et al.); U.S. Pat. No. 4,855,184 (Klun et al.); and U.S. Pat. No. 6,224,949 (Wright et al.).

Useful free-radical thermal initiators include, for example, azo, peroxide, persulfate, and redox initiators, and combinations thereof.

Useful free-radical photoinitiators include, for example, those known as useful in the UV cure of acrylate polymers. Such initiators include benzophenone and its derivatives; benzoin, alpha-methylbenzoin, alpha-phenylbenzoin, alpha-allylbenzoin, alpha-benzylbenzoin; benzoin ethers such as benzil dimethyl ketal (commercially available under the trade designation "IRGACURE 651" from Ciba Specialty Chemicals Corporation of Tarrytown, N.Y.), benzoin methyl ether, benzoin ethyl ether, benzoin n-butyl ether; acetophenone and its derivatives such as 2-hydroxy-2-methyl-1-phenyl-1-propanone (commercially available under the trade designation "DAROCUR 1173" from Ciba Specialty Chemicals Corporation) and 1-hydroxycyclohexyl phenyl ketone (commercially available under the trade designation "IRGACURE 184", also from Ciba Specialty Chemicals Corporation); 2-methyl-1-[4-(methylthio)phenyl]-2-(4-morpholinyl)-1-propanone commercially available under the trade designation "IRGACURE 907", also from Ciba Specialty Chemicals Corporation); 2-benzyl-2-(dimethylamino)-1-[4-(4-morpholinyl)phenyl]-1-butanone commercially available under the trade designation "IRGACURE 369" from Ciba Specialty Chemicals Corporation); aromatic ketones such as benzophenone and its derivatives and anthraquinone and its derivatives; onium salts such as diazonium salts, iodonium salts, sulfonium salts; titanium complexes such as, for example, that which is commercially available under the trade designation "CGI 784 DC", also from Ciba Specialty Chemicals Corporation); halomethylnitrobenzenes; and mono- and bis-acylphosphines such as those available from Ciba Specialty Chemicals Corporation under the trade designations "IRGACURE 1700", "IRGACURE 1800", "IRGACURE 1850", "IRGACURE 819" "IRGACURE 2005", "IRGACURE 2010", "IRGACURE 2020" and "DAROCUR 4265". Combinations of two or more photoinitiators may be used. Further, sensitizers such as 2-isopropyl thioxanthone, commercially available from First Chemical Corporation, Pascagoula, Miss., may be used in conjunction with photoinitiator(s) such as "IRGACURE 369".

Other Reactive and Non-Reactive Ingredients

A variety of inorganic oxide particles can be used in the surface layer. The particles are typically substantially spherical in shape and relatively uniform in size. The particles can have a substantially monodisperse size distribution or a polymodal distribution obtained by blending two or more substantially monodisperse distributions. The inorganic oxide particles are typically non-aggregated (substantially discrete), as aggregation can result in precipitation of the inorganic oxide particles or gelation of the hardcoat. The inorganic oxide particles are typically colloidal in size, having an average particle diameter of about 0.001 to about 0.2 micrometers, less than about 0.05 micrometers, and less than about 0.03 micrometers. These size ranges facilitate dispersion of the inorganic oxide particles into the binder resin and provide ceramers with desirable surface properties and optical clarity. The average particle size of the inorganic oxide particles can be measured using transmission electron microscopy to count the number of inorganic oxide particles of a given diameter. Inorganic oxide particles include colloidal silica, colloidal titania, colloidal alumina, colloidal zirconia, colloidal vanadia, colloidal chromia, colloidal iron oxide, colloidal antimony oxide, colloidal tin oxide, and mixtures thereof. The inorganic oxide particles can consist essentially of or consist of a single oxide such as silica, or can comprise a combination of oxides, such as silica and aluminum oxide, or a core of an oxide of one type (or a core of a material other than a metal oxide) on which is deposited an oxide of another type. Silica is a common inorganic particle. The inorganic oxide particles are often provided in the form of a sol containing a colloidal dispersion of inorganic oxide particles in liquid media. The sol can be prepared using a variety of techniques and in a variety of forms including hydrosols (where water serves as the liquid medium), organosols (where organic liquids so serve), and mixed sols (where the liquid medium contains both water and an organic liquid), e.g., as described in U.S. Pat. No. 5,648,407 (Goetz et al.); U.S. Pat. No. 5,677,050 (Bilkadi et al.) and U.S. Pat. No. 6,299,799 (Craig et al.), the disclosure of which is incorporated by reference herein. Aqueous sols (e.g. of amorphous silica) can be employed. Sols generally contain at least 2 wt-%, at least 10 wt-%, at least 15 wt-%, at least 25 wt-%, and often at least 35 wt-% colloidal inorganic oxide particles based on the total weight of the sol. The amount of colloidal inorganic oxide particle is typically no more than 50 wt-% (e.g. 45 wt-%). The surface of the inorganic particles can be "acrylate functionalized" as described in Bilkadi et al. The sols can also be matched to the pH of the binder, and can contain counterions or water-soluble compounds (e.g., sodium aluminate)

The surface layer can conveniently be prepared by mixing an aqueous sol of inorganic oxide particles with a free-radically curable binder precursor (e.g., one or more free-radically curable monomers, oligomers or polymers that can participate in a crosslinking reaction upon exposure to a suitable source of curing energy). The resulting composition usually is dried before it is applied, in order to remove substantially all of the water. This drying step is sometimes referred to as "stripping". An organic solvent can be added to the resulting ceramer composition before it is applied, in order to impart improved viscosity characteristics and assist in coating the ceramer composition onto the substrate. After coating, the ceramer composition can be dried to remove any added solvent, and then can be at least partially hardened by exposing the dried composition to a suitable source of energy in order to bring about at least partial cure of the free-radically curable binder precursor.

The coating composition described herein may further various other reactive and non-reactive ingredients. For example the composition may comprise polymerizable (meth)acryl compounds with alkyl, perfluoroalkyl, and perfluoroalkylene moieties. Examples of these compounds include butyl acrylate, 1H,1H-2,2,3,3,4,4,4-heptafluorobutyl acrylate, available from Sigma-Aldrich; 1H,1H,2H,2H-perfluorodecyl acrylate, available from Lancaster Synthesis, Windham, N.H.; and $C_4F_9SO_2N(CH_3)CH_2CH_2OC(O)CH=CH_2$ made by the procedure of Examples 2A and 2B of WO01/30873A. Numerous other (meth)acryl compounds with perfluoroalkyl moieties are mentioned in U.S. Pat. No. 4,968,116 and in U.S. Pat. No. 5,239,026 (including (perfluorocyclohexyl)methyl acrylate).

The compositions described herein are typically, thought not always, free of hydrophilic ingredients since the inclusion of such tends to reduce anti-soiling properties as well as stain certain media. Hydrophilic components are also susceptible to degradation upon exposure to aqueous based cleaning agents.

Those skilled in the art appreciate that the coating compositions can contain other optional adjuvants, such as, binders, surfactants, antistatic agents (e.g., conductive polymers), leveling agents, photosensitizers, ultraviolet ("UV") absorbers, stabilizers, antioxidants, lubricants, pigments, dyes, plasticizers, suspending agents and the like. Other components which may be added to the surface layer include those described in U.S. Pat. No. 6,730,388, which is incorporated by reference herein in its entirety.

Substrates

A variety of substrates can be utilized in the articles of the invention. Suitable substrate materials include fibrous substrates, such as woven, non-woven and knit fabrics, textiles, carpets, leather, and paper, and hard substrates, such as vinyl, wood, ceramic, masonry, concrete, natural stone, man-made stone, grout, metal sheets and foils, wood, paint, plastics, and films of thermoplastic resins, such as polyesters, polyamides (nylon), polyolefins, polycarbonates and polyvinylchloride, and the like. Typically the substrate will be chosen based in part on the presence of reactive groups that are capable of forming a covalent or hydrogen bond with reactive groups in the coating composition. Examples of such reactive group include, but are not limited to, chloride, bromide, iodide, alkene (C=C), alkyne, —OH, —$CO_2$, CONH groups and the like.

The substrate can be treated to improve adhesion between the substrate and the hardcoat layer, e.g., by incorporating reactive groups into the substrate surface though chemical treatment, etc. If desired, an optional tie layer or primer can be applied to the substrate and/or hardcoat layer to increase the interlayer adhesion.

Application of the Coating Composition to the Substrate

The coating composition can be applied to the hardcoat using a variety of conventional coating methods. Suitable coating methods include, for example, spin coating, knife coating, die coating, wire coating, flood coating, padding, spraying, roll coating, dipping, brushing, foam application, and the like. The coating is dried, typically using a forced air oven. The dried coating is at least partially and typically completely cured using an energy source.

Preferred energy sources include ultraviolet light curing devices that provide a UV "C" dosage of about 5 to 60 millijoules per square centimeter ($mJ/cm^2$). Preferably curing takes place in an environment containing low amounts of oxygen, e.g., less than about 100 parts per million. Nitrogen gas is a preferred environment.

Preferably the coating composition is applied at a sufficient amount to provide a cured layer having a thickness of at least about 10 nanometers, and preferably at least about 25 nanometers. Typically, the cured layer has a thickness of less than about 50 mils, preferably less than about 10 mils, and more preferably less than about 5 mils. Accordingly, the bulk of the durability is provided by the underlying surface layer.

Further features and advantages of this invention are further illustrated by the following examples, which are in no way intended to be limiting thereof. The present invention should not be considered limited to the particular examples described herein, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

EXAMPLES

As used in the following examples, "HFPO-" refers to the end group $F(CF(CF_3)CF_2O)aCF(CF_3)$— wherein "a" ranges between 5 and 12, and averages about 6.3, with an average molecular weight of 1,211 g/mol, and which can be prepared according to the method reported in U.S. Pat. No. 3,250,808 (Moore et al.), the disclosure of which is incorporated herein by reference, with purification by fractional distillation.

Synthesis of HFPO-Oligomer Alcohol
$CF_3CF_2CF_2$—O—$(CF(CF_3)CF_2O)_{6.8}CF(CF_3)$
$CONHCH_2CH_2OH$, Also Referred to as $(HFPO)_{8.8}$-alcohol A 1 liter 3-necked reaction flask was equipped with a stirrer, a condenser, a dropping funnel, a heating mantle and a thermometer. The flask was charged with 1000 g. $CF_3CF_2CF_2$—O—$(CF(CF_3)CF_2O)_{6.8}CF(CF_3)COOCH_3$. The mixture was heated to 40° C. and 43.4 g ethanolamine was added via the dropping funnel, over a period of 30 minutes. The reaction mixture was kept at 65° C. during 3 hours. FTIR analysis indicated complete conversion. The end product could be purified as follows: 500 ml ethyl acetate were added and the organic solution was washed with 200 ml HCL (1N), followed by 2 washings with 200 ml brine. The organic phase was dried over $MgSO_4$. Ethyl acetate was evaporated with waterjet vacuum, using a Büchi rotavapor. The product was dried at 50° C. during 5 hours, using oil pump vacuum (<1 mbar). An alternative purification step includes evaporation of methanol, formed during reaction, via water jet vacuum, using a Büchi rotavapor (up to 75° C.=<100 mm Hg). Residual methanol was further removed with oil pump vacuum (up to 80° C., =<10 mbar). The HFPO-oligomer alcohol $(HFPO)_{8.8}$-alc obtained, was a yellow coloured oil, with medium viscosity. The structure was confirmed by means of NMR.

Synthesis of $(HFPO)_{8.8}$-methacrylate, Indicated Also as the $(HFPO)_{8.8}$-methacrylate $CF_3CF_2CF_2$—O—$(CF(CF_3)CF_2O)_{6.8}CF(CF_3)$
$CONHCH_2CH_2O_2CC(Me)=CH_2$ (Structure FC-1) was made starting from the corresponding $(HFPO)_{6.8}$-alc $CF_3CF_2CF_2$—O—$(CF(CF_3)CF_2O)_{6.8}CF(CF_3)$
$CONHCH_2CH_2OH$, with $M_W$ 1100. 725.2 g $(HFPO)_{8.8}$-alc were placed in a 2 liter three-necked round bottom flask, equipped with a condenser, a stirrer, a nitrogen inlet and a temperature control. 64.4 g methacrylic anhydride and 280 ml HFE 7100 were added. The mixture was stirred until the reagents were dissolved. 1 g concentrated sulfuric acid was added. An exothermic reaction was noted. The reaction was stirred at room temperature overnight after the exotherm had subsided. 1000 ml DI water were added. The mixture was shaken. After the emulsion had been allowed to separate overnight, the organic phase was separated and the solvent was removed under reduced pressure. IR analysis and gas chromatography confirmed the formation of the methacrylate ester.

Examples 1-8

To 100 parts of Sartomer CN 306 (Sartomer Company, Exton, Pa.), 1 part of photo-initiator Darocur 1173 (from Ciba Geigy) and 1 part of (HFPO)$_{8.8}$-methacrylate with FC-1 (structures shown below) at concentrations ranging of 0, 0.75, 0.150, 0.200, 1.000, 2.000, 5.000, 10.000 wt-% were added together with agitation to give a viscous liquid formulation.

CF$_3$CF$_2$CF$_2$—O—(CF(CF$_3$)CF$_2$O)$_{6.8}$CF(CF$_3$) CONHCH$_2$CH$_2$O$_2$CC(Me)=CH$_2$ (FC-1) where n=5 to 12

The formulations describe above were applied onto a 3"×5" uncoated vinyl tile (Excelon Vinyl Tile from Armstrong World Industries, Inc., Lancaster, Pa.) using a #10 Meyer bar to give ~1 mil thick wet film. The coated substrate was then immediately cured under nitrogen atmosphere using RPC UV processor with medium mercury arc.

The contact angles of the applied samples were determined for hexadecane and water. Ten drops of each was read; the numbers were averaged and reported. The equipment used was NRL Contact Angle Goniometer Model #100-00 available from Rame-Hart Inc.

TABLE 1

Contact Angle measurements with increasing amounts of FC-1

| Sample | Weight % of FC-1 in CN 306 | Adv. Water | Rec. water | Rec HD |
|---|---|---|---|---|
| E1 | 0.000 | 73 | 48 | 9 |
| E2 | 0.075 | 105 | 62 | 46 |
| E3 | 0.150 | 110 | 67 | 52 |
| E4 | 0.200 | 111 | 69 | 55 |
| E5 | 1.000 | 117 | 71 | 59 |
| E6 | 2.000 | — | — | 60 |
| E7 | 5.000 | 117 | 77 | 60 |
| E8 | 10.000 | 114 | 81 | 60 |

The formulation E5 was prepared as described above (1 wt-% FC-1 in CN-306) and applied onto a 3"×5" uncoated piece of vinyl tile, wood, glass, copper, stainless steel, nylon and polyester film using a #10 Meyer bar to give ~1 mil thick wet film. The coated substrate was then immediately cured under nitrogen atmosphere using RPC UV processor with medium mercury arc. Each substrate was cured in 1"×4" in size and immerse in a beaker of boiling water with agitation. The substrates were checked for delamination and the results are summarized Table 2.

TABLE 2

Delamination of coating (1% FC-1 in CN306) on various substrates

| FC-1 at 1% | Vinyl | Wood | Glass | Copper | Stainless Steel | Nylon Film | Polyester Film |
|---|---|---|---|---|---|---|---|
| Delamination (5 min at 100° C) | No | No | Yes | No | No | No | No |
| Delamination (30 min at 100° C) | No | No | Yes | No | Slight | No | No |
| Delamination (60 min at 100° C) | No | No | Yes | Slight | Poor | No | No |

Example 9

To 100 parts of Sartomer CN 306 (Sartomer Company, Exton, Pa.), 1 part of photo-initiator Darocur 1173 (from Ciba Geigy) and 1 part of FC-2 (structure shown below) were added together with agitation to give a viscous liquid formulation.

C$_4$F$_9$SO$_2$N(Me)-C$_2$H$_4$—O$_2$CCH=CH$_2$      (FC-2)

This formulation was applied onto a 3"×5" uncoated vinyl tile (Excelon Vinyl Tile from Armstrong World Industries, Inc., Lancaster, Pa.) using a #10 Meyer bar to give 1 mil thick wet film. The coated substrate was then immediately cured under nitrogen atmosphere using RPC UV processor (Plainfield, Ill.) with medium mercury arc.

The coated vinyl substrate had a hexadecane receding contact angle of 30.

Various modifications and alterations to this invention will be apparent to those skilled in the art without departing from the spirit and scope of the invention. It should be understood that this invention is not intended to be unduly limited by the illustrative embodiments set forth herein and that such embodiments are presented by way of example only with the scope of the invention intended to be limited only by the claims which follow.

The complete disclosures of the patents, patent documents, and publications cited herein are hereby incorporated by reference in their entirety as if each were individually incorporated.

What is claimed is:

1. An article comprising
    a reactive substrate selected from the group consisting of: leather, paper, masonry, concrete, natural stone, man-made stone, grout, metal sheets and metal foils, polyvinylchloride, and paint, and
    a surface layer comprising the reaction product of at least one monoterminated (per)fluoropolyether (meth)acryl compound and at least one non-fluorinated monomer or oligomer having at least two (meth)acryl groups;
    wherein the reactive substrate forms a covalent or hydrogen bond with the surface layer.

2. The article of claim 1, wherein the substrate has reactive groups that interact with the surface layer to aid in adhesion.

3. The article of claim 1, wherein the fluoropolyether (meth)acryl compound comprises at least one terminal F(CF (CF$_3$)CF$_2$O)xCF(CF$_3$)— group and at least two meth(acryl) groups, wherein x averages from 3 to 15.

4. The article of claim 1, wherein the monomer or oligomer comprises tripropylene glycol diacrylate.

5. The article of claim 1, wherein the surface layer provides the article with a low surface energy.

6. A method of protecting a substrate surface, the method comprising the steps of:
    providing a reactive substrate selected from the group consisting of: leather, paper, masonry, concrete, natural stone, man-made stone, grout, metal sheets and metal foils, polyvinylchloride, and paint,
    coating the substrate with a coating composition comprising at least one monoterminated (per)fluoropolyether (meth)acryl compound and at least one non-fluorinated monomer or oligomer having at least two (meth)acryl groups,
    polymerizing the coating composition to provide a protective surface layer on the article, wherein the reactive substrate forms a covalent or hydrogen bond with the surface layer.

7. The method of claim 6, wherein the substrate has reactive groups that interact with the surface layer to aid in adhesion.

8. The method of claim 6, wherein the fluoropolyether (meth)acryl compound comprises at least one terminal F(CF(CF$_3$)CF$_2$O)xCF(CF$_3$)— group and at least two meth(acryl) groups, wherein x averages from 3 to 15.

9. The method of claim 6, wherein the monomer or oligomer comprises tripropylene glycol diacrylate.

10. The method of claim 6, wherein the surface layer provides the article with a low surface energy.

11. An article comprising
a porous substrate selected from the group consisting of: leather, paper, ceramic, masonry, concrete, natural stone, man-made stone, grout, metal sheets and metal foils, paint, and polyvinylchloride, and
a surface layer comprising the reaction product of at least one monoterminated (per)fluoropolyether (meth)acryl compound and at least one non-fluorinated monomer or oligomer having at least two (meth)acryl groups;
wherein the surface layer penetrates pores of the substrate.

12. The article of claim 11, wherein the fluoropolyether (meth)acryl compound comprises at least one terminal F(CF(CF$_3$)CF$_2$O)xCF(CF$_3$)— group and at least two meth(acryl) groups, wherein x averages from 3 to 15.

13. The article of claim 11, wherein the monomer or oligomer comprises tripropylene glycol diacrylate.

14. The article of claim 11, wherein the surface layer provides the article with a low surface energy.

15. A method comprising
a porous substrate selected from the group consisting of: leather, paper, ceramic, masonry, concrete, natural stone, man-made stone, grout, metal sheets and metal foils, paint, and polyvinylchloride and
a surface layer comprising the reaction product of at least one monoterminated (per)fluoropolyether (meth)acryl compound and at least one non-fluorinated monomer or oligomer having at least two (meth)acryl groups;
wherein the surface layer penetrates pores of the substrate.

16. The method of claim 15, wherein the fluoropolyether (meth)acryl compound comprises at least one terminal F(CF(CF$_3$)CF$_2$O)xCF(CF$_3$)— group and at least two meth(acryl) groups, wherein x averages from 3 to 15.

17. The method of claim 15, wherein the monomer or oligomer comprises tripropylene glycol diacrylate.

18. The method of claim 15, wherein the surface layer provides the article with a low surface energy.

19. The article of claim 1, wherein the reactive substrate comprises a reactive group selected from at least one of: —Cl, —Br, —I, and —OH.

20. The article of claim 1, wherein the reactive substrate comprises a reactive group selected from at least one of: alkene (C=C), alkyne, —CO$_2$, and —CONH.

21. The article of claim 1, wherein the reactive substrate is a porous substrate.

22. The article of claim 1, wherein the total amount of the at least one monoterminated (per)fluoropolyether (meth)acryl compound in the reaction product is present in an amount of no more than 15 wt %.

* * * * *